United States Patent
Watanabe et al.

(10) Patent No.: US 9,633,684 B2
(45) Date of Patent: Apr. 25, 2017

(54) MAGNETIC RECORDING MEDIUM, METHOD FOR MANUFACTURING MAGNETIC RECORDING MEDIUM, AND MAGNETIC RECORDING/REPRODUCTION APPARATUS

(71) Applicant: KABUSHIKI KAISHA TOSHIBA, Minato-ku (JP)

(72) Inventors: Akira Watanabe, Kawasaki (JP); Soichi Oikawa, Hachioji (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 60 days.

(21) Appl. No.: 14/528,277

(22) Filed: Oct. 30, 2014

(65) Prior Publication Data

US 2016/0064023 A1    Mar. 3, 2016

(30) Foreign Application Priority Data

Aug. 29, 2014  (JP) .................................. 2014-175005

(51) Int. Cl.
G11B 5/66    (2006.01)
G11B 5/855   (2006.01)
G11B 5/73    (2006.01)

(52) U.S. Cl.
CPC .............. *G11B 5/855* (2013.01); *G11B 5/732* (2013.01)

(58) Field of Classification Search
None
See application file for complete search history.

(56) References Cited

U.S. PATENT DOCUMENTS

| | | |
|---|---|---|
| 2008/0206601 A1 | 8/2008 | Mukai |
| 2009/0117410 A1 | 5/2009 | Itoh et al. |
| 2009/0239381 A1* | 9/2009 | Nishimi ............... B01D 69/141 438/694 |
| 2012/0263975 A1 | 10/2012 | Oikawa |
| 2015/0162042 A1* | 6/2015 | Kimura .................. G11B 5/656 428/832.2 |

FOREIGN PATENT DOCUMENTS

| | | |
|---|---|---|
| JP | 2010-192016 | 9/2010 |
| JP | 2012-226792 | 11/2012 |

OTHER PUBLICATIONS

English Machine translation of JP 2010-192016, Japan, Sep. 2010.*
Rahman et al., IEEE Tran Magn, vol. 43, No. 6, Jun. 2007, pp. 2133-2135.*
Laughlin et al., IEEE Trans Magn, vol. 43, No. 2, Feb. 2007, pp. 693-697.*
M. Tofizur Rahman, et al., "Magnetic multilayers on porous anodized alumina for percolated perpendicular media", Applied Physics Letters, vol. 91, Sep. 26, 2007, 3 pgs.

* cited by examiner

*Primary Examiner* — Holly Rickman
(74) *Attorney, Agent, or Firm* — Oblon, McClelland, Maier & Neustadt, L.L.P.

(57) ABSTRACT

According to one embodiment, a magnetic recording medium includes a silicon oxide underlayer having a recess pattern having a plurality of recesses, a nonmagnetic underlayer having a first hole pattern having a plurality of holes corresponding to the recess pattern, and a magnetic recording layer having a second hole pattern having a plurality of holes connected with the first hole pattern. The silicon oxide underlayer, the nonmagnetic underlayer, and the magnetic recording layer are formed in order on the substrate.

12 Claims, 4 Drawing Sheets

MAGNETIC RECORDING MEDIUM, METHOD FOR MANUFACTURING MAGNETIC RECORDING MEDIUM, AND MAGNETIC RECORDING/REPRODUCTION APPARATUS

CROSS-REFERENCE TO RELATED APPLICATIONS

This application is based upon and claims the benefit of priority from Japanese Patent Application No. 2014-175005, filed Aug. 29, 2014, the entire contents of which are incorporated herein by reference.

FIELD

Embodiments described herein relate generally to a magnetic recording medium.

BACKGROUND

In a CoCrPt-oxide granular type magnetic recording layer to be presently used, CoCrPt particles must be downsized with an improvement in a recording density. If the magnetic particles are downsized, however, the thermal stability decreases. Then, a medium called a PPM has been proposed. In the PPM, bits are maintained by pinning domain walls by forming holes or nonmagnetic pinning sites in a domain wall motion type magnetic layer. Examples of the method for forming the pinning sites include a method for forming a nonmagnetic metal part in a magnetic recording layer according to sputtering film formation or the like, and a method for forming holes in a magnetic recording layer utilizing an underlayer having a hole convex. The method for forming nonmagnetic pinning sites according to sputtering film formation or the like makes it difficult to control the position and shape of a nonmagnetic part in principle, which increases the position of the nonmagnetic part and the dispersion of the shape. On the other hand, although there is a report example in which a method used for an underlayer having a hole convex such as anodized alumina improves the position and the dispersion of the shape in a pitch of 30 nm or more, and forms holes in a magnetic recording layer, the method makes it difficult to achieve a high density equal to or greater than the present recording density in the size. When the pitch is less than 30 nm, the method makes it difficult to set the position and the dispersion of the shape to 15% or less.

DETAILED DESCRIPTION

A magnetic recording medium according to an embodiment includes: a substrate; a silicon oxide underlayer having a recess pattern having a plurality of recesses; a nonmagnetic underlayer having a first hole pattern having a plurality of holes; and a magnetic recording layer having a second hole pattern having a plurality of holes. The silicon oxide underlayer, the nonmagnetic underlayer, and the magnetic recording layer are formed in order on the substrate.

The plurality of recesses arranged in a predetermined pattern, the plurality of holes of the first hole pattern, and the plurality of holes of the second hole pattern are disposed so as to correspond to each other. The plurality of holes of the first hole pattern are connected to the plurality of holes of the second hole pattern.

The hole herein refers to a through hole penetrating the whole film. However, the first hole pattern and the second hole pattern are required to be connected with each other. The first hole pattern and the second hole pattern can integrally form the through hole. Even when the first hole pattern and the second hole pattern are slightly connected to each other, the first hole pattern and the second hole pattern may be connected with each other.

A magnetic recording/reproduction apparatus according to an embodiment has the above-mentioned magnetic recording medium and a magnetic head.

According to the embodiment, the nonmagnetic underlayer for orientation control, and the magnetic recording layer are formed in order on the silicon oxide underlayer having a recess pattern having a plurality of recesses arranged in a predetermined pattern, to form a hole according to the recess pattern of the silicon oxide underlayer in the magnetic recording layer. This hole functions as pinning sites which pin domain walls in PPM (Percolated Perpendicular Media).

A method for manufacturing a magnetic recording medium according to an embodiment includes: preparing a coating solution containing a material forming silicon oxide, and a self-organization material; applying the coating solution on a substrate; phase-separating the obtained applied film to form a sea island phase which has a sea-like phase containing the silicon oxide material and an organic component and an island-like phase containing an organic component; decomposing the organic component by heating to form a silicon oxide underlayer having a recess pattern having a plurality of recesses in a portion equivalent to the island-like phase; forming a nonmagnetic underlayer on the silicon oxide underlayer; and forming a magnetic recording layer on the nonmagnetic underlayer.

For example, in a silicon oxide hole pattern produced using a diblock copolymer as the self-organization material, size dispersion of holes tends to be decreased to, for example, 15% or less. Uniform pinning sites can be formed in the magnetic recording layer.

The diameters of the plurality of recesses of the silicon oxide underlayer can be set to 10 nm or more, and the plurality of recesses can be regularly arranged in a pitch of 30 nm or less. A grain boundary of the magnetic recording layer can be formed so as to connect the holes in the magnetic recording layer by setting the diameters of the recesses to 10 nm or more and setting a distance between the recesses to 30 nm or less. Therefore, the pinning sites can pin the domain walls.

Hereinafter, an embodiment will be described with reference to the drawings.

Figure 1:
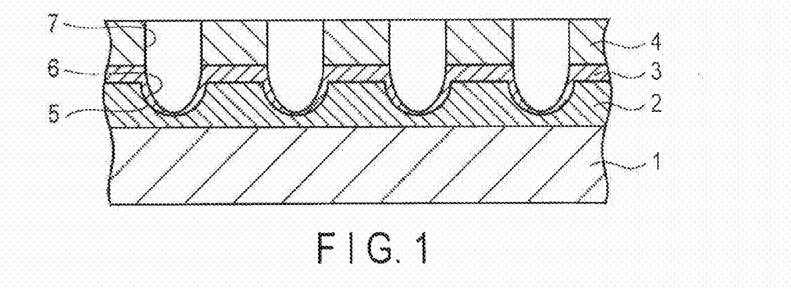
FIG. 1 is an exemplary sectional view showing a configuration of a magnetic recording medium according to an embodiment.

FIG. 1 is an exemplary sectional view showing a configuration of a magnetic recording medium according to an embodiment.

As shown in FIG. 1, a magnetic recording medium 10 according to an embodiment includes a substrate 1, a silicon oxide underlayer 2 formed on the substrate 1 and having a recess pattern having a plurality of recesses 5, a nonmagnetic underlayer 3 having a first hole pattern having a plurality of holes 6 corresponding to the recess pattern, and a magnetic recording layer 4 formed on the nonmagnetic underlayer 3 and having a second hole pattern having a plurality of holes 7 connected with the first hole pattern.

Figure 2A:
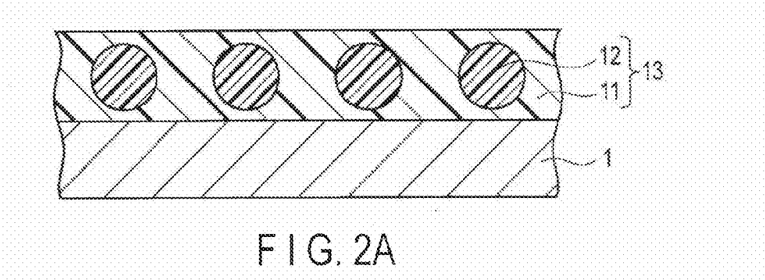
FIG. 2A shows an example of a manufacturing step of a magnetic recording medium according to an embodiment.
Figure 2B:
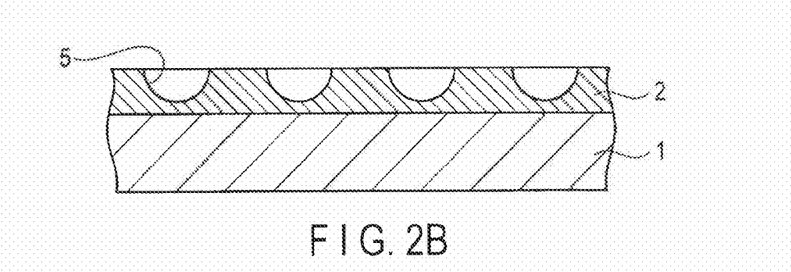
FIG. 2B shows an example of a manufacturing step of a magnetic recording medium according to an embodiment.
Figure 2C:
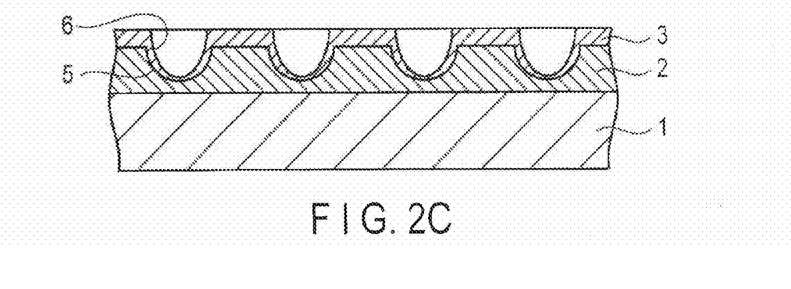
FIG. 2C shows an example of a manufacturing step of a magnetic recording medium according to an embodiment.

FIGS. 2A to 2C are exemplary sectional views showing an example of a method for manufacturing the magnetic recording medium 10 shown in FIG. 1.

In a method for manufacturing a magnetic recording medium according to an embodiment, first, a coating solution is prepared, which contains a silicon oxide material, for example, spin-on glass (SOG) and a self-organization material, for example, PS (polystyrene)-PEO (polystyrene-polyethyleneoxide) diblock copolymer. Next, the coating solution is applied on a substrate by, for example, a spin coat method to form a self-organization film 13. The self-organization film 13 is retained under an atmosphere of, for example, chloroform and octane for 5 hours, and thereby the self-organization film 13 is phase-separated. Therefore, as shown in FIG. 2A, a sea island phase is formed, which contains an island-like polymer phase 12 made of PS, and a continuous sea-like polymer phase 11 surrounding the island-like polymer phase 12 and made of PEO containing SOG. The self-organization film 13 may be retained in the atmosphere at room temperature for 20 hours as a method for promoting self-organization.

Next, PS and PEO which are organic materials in the self-organization film 13 are decomposed by heating the substrate to, for example, 500° C. under a nitrogen atmosphere. As shown in FIG. 2B, a recess 5 is formed in a portion equivalent to the island-like polymer phase 12. A silicon oxide underlayer 2 which has a recess pattern having a plurality of recesses 5 and is made of SOG is formed in a portion equivalent to the sea-like polymer phase 11.

Then, the nonmagnetic underlayer 3 is formed on the silicon oxide underlayer 2 by sputtering. The obtained nonmagnetic underlayer 3 has a first hole pattern having a plurality of holes 6 corresponding to a recess pattern.

Then, a magnetic recording layer 4 is formed on the nonmagnetic underlayer 3 by sputtering. The obtained magnetic recording layer 4 has a second hole pattern having a plurality of holes 7 connected with the first hole pattern. Thus, a magnetic recording medium as shown in FIG. 1 is obtained.

The diameter of the recess 5 formed in the silicon oxide underlayer 2 is defined as A; the pitch between the recesses 5 is defined as L; and the diameter of the magnetic particle of the magnetic recording layer 4 is defined as R. These can regulate the condition of the magnetic recording medium according to the embodiment.

Figure 3:
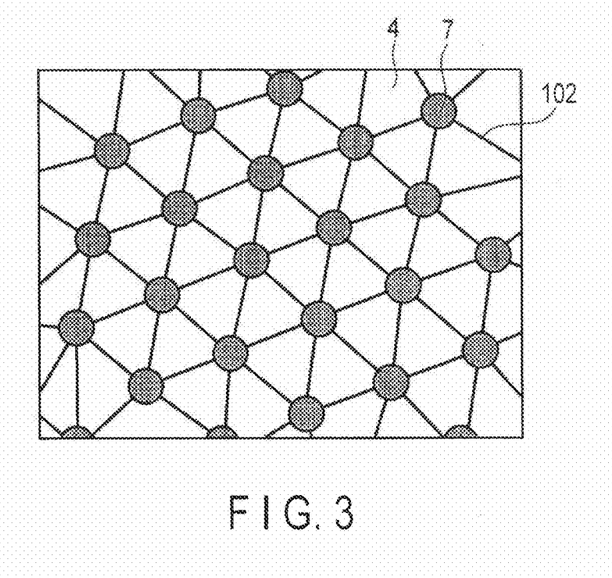
FIG. 3 is an exemplary view showing an example of a condition of an upper surface of a magnetic recording layer of a magnetic recording medium according to an embodiment.

FIG. 3 is an exemplary view showing an example of a condition of an upper surface of a magnetic recording layer of a magnetic recording medium according to an embodiment.

In the magnetic recording medium according to the embodiment, as shown in FIG. 3, a grain boundary 102 of the magnetic recording layer 4 can be formed so as to connect the holes 7. The domain walls can be pinned so as to connect the holes by the configuration of the grain boundary 102. As a condition for producing a medium having the grain boundary 102, the following formula (1) can be satisfied:

$$R > L - A \quad (1)$$

The diameter A and the pitch L can be adjusted in the step of forming the silicon oxide underlayer.

The silicon oxide underlayer is produced by mixing polystyrene (PS)-polyethyleneoxide (PEO) as a diblock copolymer, and spin-on glass (SOG), as a typical example. However, the pitch L can be adjusted by changing the molecular weight of PS-PEO. For example, a silicon oxide underlayer having a pitch L of about 27 nm can be formed by using PS-PEO having a molecular weight of about 18,000. A silicon oxide underlayer having a pitch L of about 19 nm can be formed by using PS-PEO having a molecular weight of about 6,000. And a silicon oxide underlayer having a pitch L of about 15 nm can be formed by using PS-PEO having a molecular weight of about 3,600.

The diameter A can be adjusted by changing the mixing rate of SOG. For example, when PS-PEO having a molecular weight of 18,000 is used, and an amount of SOG to be added is about 10 wt %, the diameter A is about 20 nm. When the amount of SOG to be added is set to about 20 wt %, the diameter A is 15 nm. When an amount of SOG to be added is set to 35 wt %, the diameter A can be decreased to about 7 nm.

The diameter R can be controlled by a material of the magnetic recording layer, and a degree of vacuum, a film-forming rate, a substrate temperature, and a shape of an underlayer or the like when the magnetic recording layer is formed. For example, the diameter R is likely to be generally decreased in the case of a magnetic recording layer containing Au and Ag or the like having high surface energy. When a film having a thickness of about 10 nm is formed, the diameter A may be set to about 5 nm. However, the diameter A can be decreased to about 13 nm by heating a substrate temperature to about 300° C. and forming a film on the same condition. In the case of Co or the like used in the embodiment, the diameter A is set to about 10 nm in many cases in film-forming at room temperature. However, when Ru or the like having large surface roughness and formed at about 3 Pa is used as the underlayer, the diameter A may be decreased to about 5 nm. As a pressure during film-forming is lower, or a film-forming rate is slower, the diameter A tends to be increased.

Furthermore, the diameter A of the recess formed in the silicon oxide underlayer, the pitch L of the recess pattern, and the diameter R of the magnetic particle of the magnetic recording layer can satisfy the above-mentioned formula (1), and the diameter A can be set to 3 nm to 25 nm; the pitch L can be set to 8 nm to 30 nm; and the diameter R can be set to 3 nm to 15 nm. When the diameter A, the pitch L, and the diameter R are within the above-mentioned numerical value ranges, the particle diameter dispersion and pitch dispersion of the magnetic particles are set to 15% or less, which tends to enable achievement of a high recording density of 800 kFCI or more in recording/reproduction characteristics.

Figure 4:
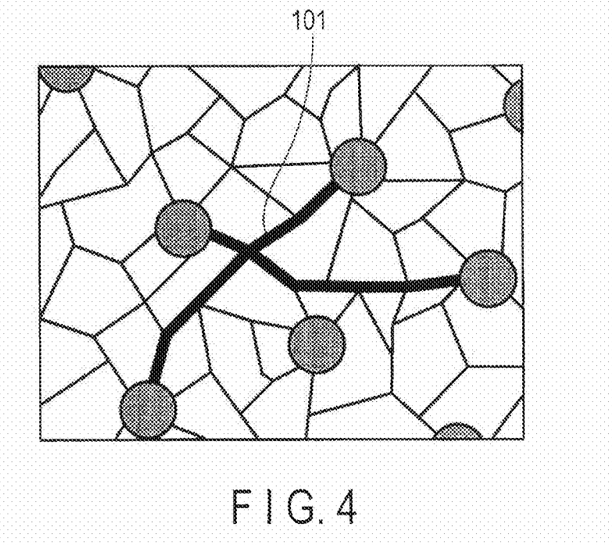
FIG. 4 is an exemplary view showing an example of a condition of an upper surface of a comparative magnetic recording layer.

FIG. 4 shows an exemplary view showing an example of a condition of an upper surface of a comparative magnetic recording layer in the case of R<L–A deviating from the condition represented by the formula (1).

As shown in FIG. 4, in the case of R<L–A, a plurality of grain boundaries are present between the holes. Thus, when the plurality of grain boundaries are present between the holes, for example, holes which are not holes most adjacent to each other may be connected to each other by the grain boundaries as in grain boundaries represented by a thick line 101 in FIG. 4. These tend to cause magnetic transition noise.

Substrate

As the substrate, for example, a glass substrate, an Al-based alloy substrate, a ceramic substrate, a carbon substrate, or an Si single-crystal substrate having an oxidized surface, or the like can be used.

Examples of the glass substrate include amorphous glass and crystallized glass. As the amorphous glass, for example, general-purpose soda lime glass and alumino silicate glass, or the like can be used. As the crystallized glass, lithium-based crystallized glass can be used. As the ceramic substrate, for example, a general-purpose sintered product mainly containing aluminum oxide, aluminum nitride, and silicon nitride or the like, or a fiber reinforced product of any of these sintered products or the like can be used.

As the substrate, a substrate obtained by forming an NiP layer on the surface of any of the above-mentioned metal substrates and non-metal substrates by using plating or sputtering can also be used.

Although only sputtering is described as the method for forming a thin film on the substrate, the same effect can be obtained by using vacuum deposition or electroplating or the like.

Nonmagnetic Underlayer

As the nonmagnetic underlayer formed on the silicon oxide underlayer, for example, Ni, Ta, Pd, Ru, Pt, Si, and alloys thereof can be used.

Generally, a Ni alloy and Pd tend to improve wettability with a substrate, and to improve a crystalline structure in a metal formed on the substrate. Ru and Pt tend to improve the crystal orientation of the magnetic recording layer formed on the nonmagnetic underlayer.

Relationship between Nonmagnetic Underlayer Film Thickness, Hole Diameter in Magnetic Recording Layer, and Ku (Magnetic Anisotropy Constant) of Magnetic Recording Layer The film thickness of the nonmagnetic underlayer is thickened, and thereby the crystal orientation of the nonmagnetic underlayer and magnetic recording layer is improved, to increase a magnetic anisotropy constant Ku. The magnetic anisotropy constant is a constant having an effect on the thickness of the domain wall. The thickness of the domain wall is generally known to be inversely proportional to a square root of Ku. Therefore, in order to pin the domain walls according to the hole pattern, the film thickness of the nonmagnetic underlayer is desirably thickened to improve Ku of the magnetic recording layer. However, the recess pattern formed in the silicon oxide underlayer is infilled by thickening the film thickness of the nonmagnetic underlayer, which tends to decrease the size of the hole formed in the magnetic recording layer. For example, when the diameter of the recess formed in the silicon oxide underlayer is about 10 nm, and the film thickness of the nonmagnetic underlayer is 40 nm or more, the size of the hole in the magnetic recording layer tends to be 1 nm or less.

Therefore, when the recess pattern having a diameter of 10 nm is formed in the silicon oxide underlayer, the film thickness of the nonmagnetic underlayer is desirably 40 nm or less. When the diameter of the recess is about 5 nm, the film thickness of the nonmagnetic underlayer is desirably 25 nm or less. When the film thickness of the nonmagnetic underlayer is less than 5 nm, the crystal orientation of the magnetic recording layer is deteriorated, which tends to decrease a coercive force to about 1 kOe. Therefore, the film thickness of the nonmagnetic underlayer can be set to 5 nm or more.

Silicon Oxide Underlayer

When the silicon oxide underlayer having a recess pattern is formed, diblock copolymers having polyethyleneoxide such as polystyrene-block-polyethyleneoxide, polyethylene-block-polyethyleneoxide, polybutadiene-block-polyethyleneoxide, poly-t-butylmethacrylate-block-polyethyleneoxide, and polymethylmethacrylate-block-polyethyleneoxide can be utilized as the self-organization material. The above diblock copolymers are taken as an example. The same effect can be obtained by a copolymer having a polymer having high polarity such as polyethyleneoxide. Not only the diblock copolymers but also triblockcopolymers may be used. After the above-mentioned self-organization material is dissolved in propylene glycol-1-methyl ether acetate (PGMEA) or the like, the silicon oxide material is added to the solution to form a resist solution. The resist solution is formed on the substrate by spin coating, and heated in vacuum or a nitrogen atmosphere at 400° C. for 4 hours or more. Thereby, an organic component can be decomposed, and a pattern containing only an inorganic component can be formed.

Examples of the silicon oxide material include hydrogen silsesquioxane (HSQ) and spin-on glass (SOG).

The shape of the pattern can be adjusted by the amount of HSQ or SOG to be added to the resist solution. For example, when PS-PEO having a molecular weight of 18,000 is used, and the amount of SOG to be added is about 10 wt %, the diameter of the hole is set to about 20 nm. When the amount of SOG to be added is set to about 20 wt %, the hole diameter is set to 15 nm. When the amount of SOG to be added is set to 35 wt %, the hole diameter can be decreased to about 7 nm.

A method for etching the silicon oxide underlayer using the self-organization material or the like as a mask, and transferring a mask pattern can also be used in order to form the hole pattern of the silicon oxide underlayer. As the mask pattern to be used, a self-organization material such as a block copolymer expressing a micro phase separation structure according to an annealing treatment can be used.

Self-Organization Material

As the block copolymer expressing a micro phase separation structure, a diblock copolymer can be used.

Examples of the diblock copolymer expressing a micro phase separation structure include polybutadiene-block-polydimethylsiloxane, polybutadiene-block-poly-4-vinylpyridine, polybutadiene-block-polymethylmethacrylate, polybutadiene-block-poly-t-butylmethacrylate, polybutadiene-block-poly-t-butylacrylate, polymethylmethacrylate-block-polyethyleneoxide, polybutadiene-block-sodium polyacrylate, polybutadiene-block-polyethyleneoxide, polyethylene-polyethyleneoxide, poly-t-butylmethacrylate-block-poly-4-vinylpyridine, polyethylene-block-polymethylmethacrylate, poly-t-butylmethacrylate-block-poly-2-vinylprydine, polyethylene-block-poly-2-vinylpyridine, polyethylene-block-poly-4-vinylpyridine, polyisoprene-block-poly-2-vinylprydine, poly-t-butylmethacrylate-blockpolystyrene, polymethylacrylate-block-polystyrene, polybutadiene-block-polystyrene, polyisoprene-block-polystyrene, polystyrenepoly-block-poly-2-vinylpyridine, polystyrene-block-poly-4-vinylpyridine, polystyrene-block-polydimethylsiloxane, polystyrene-block-poly-N,N-dimethylacrylamide, polystyrene-block-polyethyleneoxide, polystyrene-block-polysilsesquioxane, polymethylacrylate-block-polysilsesquioxane, polystyrene-block-polymethylmethacrylate, poly-t-buthylmethacrylate-block-polyetyleneoxide, and polystyrene-block-polyacrylate.

Particularly, polystyrene-block-polyethyleneoxide, polyethylene-block-polyethyleneoxide, polybutadiene-block-polyethyleneoxide, poly-t-butylmethacrylate-block-polyethyleneoxide, and polymethylmethacrylate-block-polyethyleneoxide have polyethyleneoxide having high polarity, and have good affinity with organic glass and inorganic glass such as hydrogen silsesquioxane and spin-on glass, and an inorganic material having polarity such as a metal salt.

Dry etching such as reactive ion etching or ion milling, and wet etching for immersing a sample in a solution such as an acid or alkali solution can be utilized in order to transfer the pattern to the silicon oxide underlayer. When the pattern is transferred to the silicon oxide underlayer by etching or the like, and the selected ratio of the silicon oxide underlayer and mask layer is absent, a hard mask layer can be formed on the silicon oxide underlayer.

The plurality of recesses of the silicon oxide underlayer may have a depth equal to or less than a diameter.

When the depth of the recess is greater than the diameter of the recess, surface roughness after the magnetic recording layer is formed tends to be deteriorated.

For example, a 2.5 inch magnetic recording medium can have a recess having a diameter of 3 nm to 25 nm and a depth of 1.5 nm to 12.5 nm.

Magnetic Recording Layer

A multilayered magnetic recording layer obtained by alternately stacking two or more magnetic layers and two or more nonmagnetic layers can be used as the magnetic recording layer.

The magnetic recording layer can mainly contain Co.

The nonmagnetic layer used for the magnetic recording layer can mainly contain one of Pd and Pt. Oxides such as $SiO_2$, $TiO_2$, and $Al_2O_3$ may be added as additive elements. A hole pattern having a size almost equivalent to that of the first hole pattern in the nonmagnetic underlayer can be produced in the magnetic recording layer as the second hole pattern by decreasing the film thickness.

EXAMPLES

Example 1, Comparative Example 1

A cleaned disk-like glass substrate (manufactured by Ohara, outer diameter: 2.5 inches) was prepared as a nonmagnetic substrate. This glass substrate was placed in a film-forming chamber of a magnetron sputtering apparatus (C-3010 manufactured by Canon Anelva), and the film-forming chamber was evacuated to an ultimate vacuum degree of $4 \times 10^{-5}$ Pa or less. Then, DC magnetron sputtering was performed as follows in an Ar atmosphere at a gas pressure of about 0.6 Pa unless otherwise specified.

First, a 10-nm-thick NiTa alloy layer and a 3-nm-thick Si layer as underlayers were sequentially formed on the nonmagnetic substrate. Then, the nonmagnetic substrate was removed to the atmosphere from the chamber once to form a silicon oxide underlayer. A resist containing PS-PEO as a diblock copolymer and SOG was used to form the silicon oxide underlayer. The molecular weights of polystyrene and polyethyleneoxide contained in the diblock copolymer were 3,000. T-7 10000T manufactured by Tokyo Ohka Kogyo Co., Ltd. was used as SOG. After PS-PEO and SOG were mixed at a mass ratio of 1:10, a mass percent concentration was adjusted to 4 wt % by using propyleneglycol monomethylether acetate (PGMEA).

The produced solution was applied on the substrate by spin coating, to form a resist layer having a film thickness of 20 nm.

The substrate was left at room temperature for 12 hours, and then heated to 400° C. under a nitrogen atmosphere, to decompose polystyrene and polyethyleneoxide as organic materials. A hole pattern containing SOG was formed on the substrate.

The plane SEM of the obtained medium was measured, and a particle diameter and a pitch were analyzed by the following procedure. First, the contour of each particle was extracted from an image photographed at magnification ratio of 200,000 times, using an optional image processing software. Then, the area and diameter of the particle were calculated by approximating the obtained contour information with an ellipse, and dispersion of a particle size was calculated. The center of gravity coordinate of each particle was read, and the pitch between the particles was calculated by drawing a minimum triangle (Delaunay triangle) constituted by the particles.

When the plane SEM was observed in the hole pattern, it was clear that a hole pattern was formed, which had a particle diameter of 15 nm, a pitch of 19 nm, and particle diameter dispersion and pitch dispersion of 11% or less. The pattern size formed by self-organization can be controlled to an optional size by suitably adjusting the molecular weights of PS-PEO and SOG as templates. Solvent annealing in which a sample is retained under an atmosphere of chloroform and octane may be used instead of retaining at room temperature, in order to improve the particle diameter dispersion and the pitch dispersion. In the case, a dispersed value of 10% or less or 7% or less can be obtained.

Then, the obtained substrate is returned into the film-forming chamber again, and heated at 300 to 400° C. under vacuum of about $10^{-6}$ Pa, to effectively remove films and atoms or the like considered to be formed and attached on a thin film surface by exposing the substrate to the atmosphere once. Otherwise, a clean surface can be obtained by performing reverse sputtering (sputtering of the thin film side) in an Ar atmosphere at a gas pressure of about 0.6 Pa.

A 2-nm-thick NiTa layer, a 4-nm-thick Pd layer, and a 5-nm-thick Ru layer were stacked in order on the silicon oxide underlayer having the clean surface obtained in the chamber, to form a nonmagnetic underlayer having a multilayer structure. After the Ru layer is formed, and an Ar gas pressure is then increased to 6 Pa, a 5-nm-thick Ru layer may be further stacked.

A 3-nm-thick Pt layer was further stacked to form a nonmagnetic underlayer having a total thickness of 19 nm.

Then, the Ar gas pressure was increased to 3 Pa, and a multilayered magnetic recording layer was then formed by the following procedure.

First, a 0.8-nm-thick Pt layer was formed, and a 0.4-nm-thick Co layer was further stacked. The Pt layer and Co layer were repeatedly stacked 8 times, and a 2-nm-thick Pd layer was further stacked on the last Co layer to form a multilayered magnetic recording layer.

The multilayered magnetic recording layer thus obtained is represented by [Pt/Co]8 herein. In the obtained perpendicular magnetic recording medium, the layers are stacked in the order of the substrate/NiTa (10 nm)/Si (3 nm)/silicon oxide underlayer/NiTa (2 nm)/Pd (4 nm)/Ru (5 nm)/Pt (3 nm)/[Pt/Co]8 multilayered magnetic recording layer.

Subsequently, a 6-nm-thick C protective layer was stacked on the multilayered magnetic recording layer.

After the protective layer was stacked as described above, the medium was removed from the film-forming chamber, and a 1.5-nm-thick lubricating layer made of perfluoropolyether was formed on the protective layer by dipping, thereby obtaining a perpendicular magnetic recording medium. The obtained perpendicular magnetic recording medium has the same structure as that shown in FIG. 1 except that the underlayer containing the NiTa alloy layer and the Si layer is not shown between the substrate and the silicon oxide underlayer, and the C protective layer and the lubricating layer are not shown on the multilayered magnetic recording layer.

Figure 5:
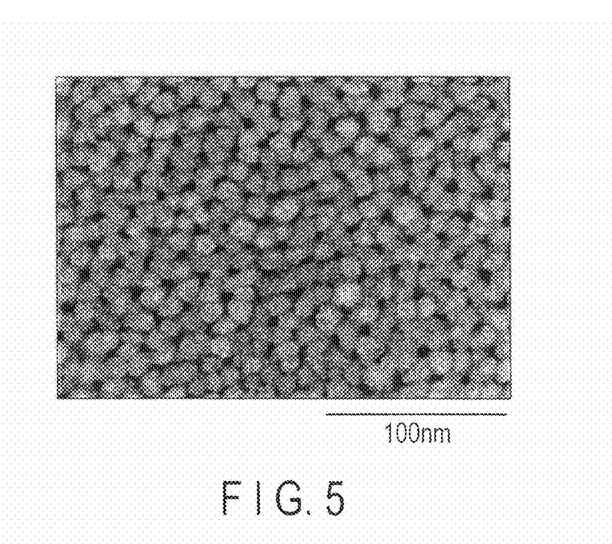
FIG. 5 shows a surface SEM photograph of a magnetic recording layer.

FIG. 5 shows a surface SEM photograph of a magnetic recording layer before the protective layer and the lubricating layer are formed.

It is found that a hole pattern having a plurality of holes is formed in the obtained magnetic recording layer, and grain boundaries of the magnetic recording layer are formed so as to connect the holes as in the exemplary view of FIG. 3.

Figure 6:
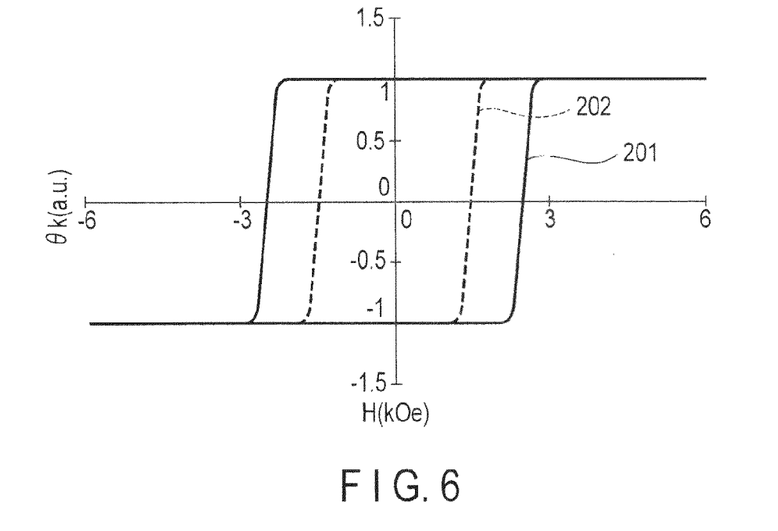
FIG. 6 is a graph chart showing a magnetostatic characteristic of a magnetic recording medium according to an embodiment.

A graph chart showing magnetostatic characteristics of the obtained magnetic recording mediums is shown in FIG. 6.

In FIG. 6, numeral number 201 designates a graph showing a magnetostatic characteristic of a magnetic recording medium according to Example 1.

A magnetic recording medium was prepared on the same condition as that of Example 1 except that a silicon oxide underlayer having no hole pattern was used as Comparative Example 1. Numeral number 202 designates a graph showing a magnetostatic characteristic of a magnetic recording medium according to Comparative Example 1.

From FIG. 6, it is found a condition where Hc of the magnetic recording medium having a hole pattern is increased as compared with that of the magnetic recording medium using the silicon oxide underlayer having no hole pattern. It is presumed that holes according to the hole pattern of the silicon oxide underlayer are formed in the magnetic recording layer, and domain walls are pinned so as to connect the holes, which accordingly complicates the movement of the domain walls.

Figure 7:
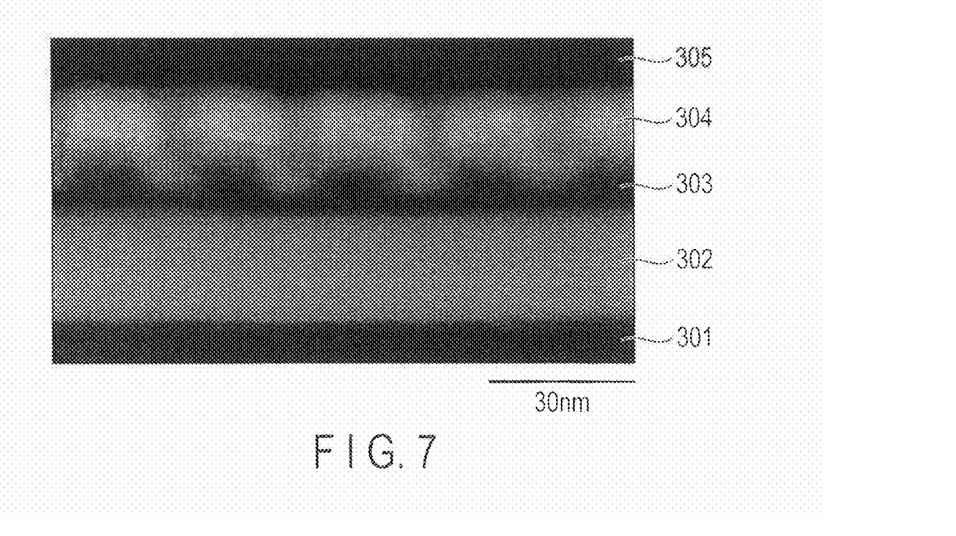
FIG. 7 is a sectional SEM photograph of a magnetic recording medium according to an embodiment.

Furthermore, FIG. 7 shows a sectional SEM photograph of the magnetic recording medium according to Example 1.

FIG. 7 shows a high-angle-annular-dark-field image (HAADF-STEM image) obtained by a scanning transmission electron microscope. In the HAADF-STEM image, an atom having a smaller mean atomic number looks blackish, and an atom having a larger mean atomic number looks whitish. In FIG. 7, numeral number 301 designates a nonmagnetic substrate; 302, an underlayer; 303, a silicon oxide underlayer; 304, a [Pt/Co]8 multilayered magnetic recording layer; and 305, a C protective layer. In the sectional structure of the [Pt/Co]8 multilayered magnetic recording layer, it is found that a multilayer structure including a Co layer having a comparatively blackish color and a Pt layer having a comparatively whitish color is formed on the silicon oxide underlayer 303 having a hole pattern. A component of the recording layer is slightly formed in each hole formed in the silicon oxide underlayer 303. However, there is found a condition where holes according to the hole pattern formed in SOG are formed in the recording layer.

The recording/reproduction characteristics were evaluated for the produced perpendicular magnetic recording medium. The recording/reproduction characteristics were evaluated by using the RH4160E spinstand manufactured by Hitachi High-Technologies. Information was recorded and reproduced by using a perpendicular recording type composite head including a shielded pole type recording element in which the distal end of an auxiliary magnetic pole was formed to extend to the vicinity of a main magnetic pole, and a tunneling magnetoresistive (TMR) reproduction element. The width in the track direction of the main magnetic pole of the recording element was about 300 nm, and measurements were performed in a radial position of 26 mm at a rotational speed of 5,400 rpm. The shielded pole type recording element was used herein, but it is also possible to use the conventional single pole type recording element in which an auxiliary magnetic pole is spaced apart from a main magnetic pole. CoFeNi was used as the material of the recording magnetic pole, but it is also possible to use materials such as CoFe, CoFeN, NbFeNi, FeTaZr, and FeTaN. An additive element can further be added to any of these magnetic materials as a main component.

Recording was performed at a linear recording density of about 200 kFCI (Flux Change/Inch) on a perpendicular magnetic recording medium using a multilayered magnetic recording layer [Ag/Pt/Co]8 formed at an Ar gas pressure of 3 Pa. As Comparative Examples, a medium was evaluated in the same manner as in Example except that a hole pattern was not formed in a silicon oxide underlayer.

Figure 8:
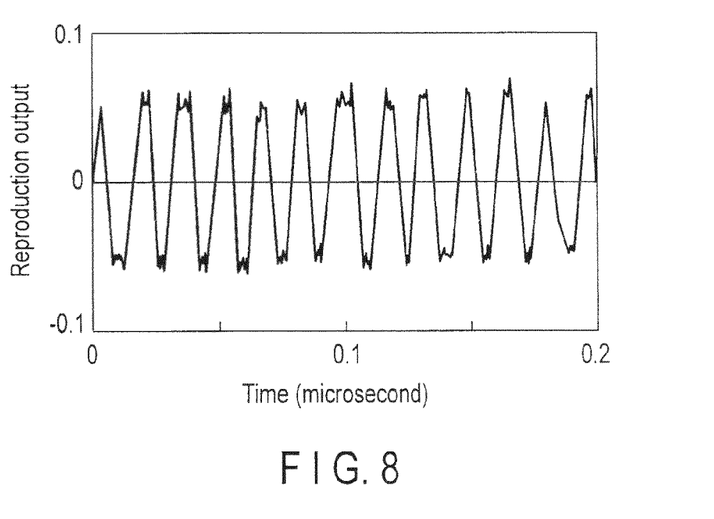
FIG. 8 is a graph showing an example of a reproduced waveform of a magnetic recording medium according to an embodiment.

FIG. 8 is a graph showing an example of a reproduced waveform of the magnetic recording medium according to Example 1.

In the comparative magnetic recording medium using the silicon oxide underlayer having no hole pattern, no pinning was performed in a [Pt/Co] superlattice formed as the magnetic recording layer, and irregular magnetic domains were formed and no recording was possible at 200 kFCI. On the other hand, in the magnetic recording medium using the silicon oxide underlayer having a hole pattern of Example 1, as shown in FIG. 6, it was found that a reproduced waveform corresponding to 200 kFCI was obtained, and the pinning effect was obtained by the hole according to an SOG hole pattern. When recording/reproduction measurement was performed with a record frequency changed, a clear reproduced waveform could be obtained also at 1000 kFCI.

Example 2

In the Case of R<L−a

A magnetic recording layer was produced in the same producing method as that of Example 1 except that a mass ratio of a diblock copolymer and SOG was changed to 1:25 from 1:10. The diblock copolymer was changed, and thereby a hole pattern of a silicon oxide underlayer had a pitch of 19 nm and a particle diameter of 7 nm.

A nonmagnetic underlayer, a magnetic recording layer, and a protective layer were formed on the above-mentioned silicon oxide underlayer in the same manner as in Example 1 to produce a perpendicular magnetic recording medium. When the upper surface SEM image of the magnetic recording layer was observed in the same manner as in Example 1, a hole pattern having a plurality of holes was formed in the obtained magnetic recording layer, and a condition where a plurality of grain boundaries were formed between the holes could be confirmed as in the exemplary view of FIG. 4. When the magnetostatic characteristic of the produced perpendicular magnetic recording medium was evaluated, a condition where Hc was increased could be confirmed as compared with a medium produced on SOG having no pattern.

The recording/reproduction characteristics of the produced perpendicular magnetic recording medium were similarly estimated in the same manner as in Example 1. The same reproduced waveform as that of FIG. 8 could be obtained in a recording density of 200 kFCI. However, when a record frequency was changed, it was found that the reproduced waveform began to collapse at about 500 KFCI; and irregular magnetic domains were formed and no recording was possible at 800 kFCI.

Comparative Example 2

The Case where a Nonmagnetic Underlayer is Thick, which has No Through Hole

A silicon oxide underlayer having a mass ratio of a diblock copolymer and SOG set to 1:10 was produced in the same manner as in Example 1. The hole pattern of the produced silicon oxide underlayer had a pitch of 19 nm and a particle diameter of 15 nm.

A 10-nm-thick NiTa layer, a 5-nm-thick Pd layer, and a 20-nm-thick Ru layer were stacked in order on the above-mentioned silicon oxide underlayer, to form a nonmagnetic underlayer having a multilayer structure.

A 5-nm-thick Pt layer was further stacked to form a nonmagnetic underlayer having a total thickness of 40 nm.

Then, the Ar gas pressure was increased to 3 Pa, and a multilayered magnetic recording layer was formed by the following procedure.

First, a 0.8-nm-thick Pt layer was formed, and a 0.4-nm-thick Co layer was further stacked. The Pt layer and Co layer were repeatedly stacked 8 times, and a 2-nm-thick Pd layer was further stacked on the last Co layer to form a multilayered magnetic recording layer.

The multilayered magnetic recording layer thus obtained is represented by [Pt/Co]8 herein. In the obtained perpendicular magnetic recording medium, the layers are stacked in the order of the substrate/NiTa (10 nm)/Si (3 nm)/silicon oxide underlayer/NiTa (10 nm)/Pd (5 nm)/Ru (20 nm)/Pt (5 nm)/[Pt/Co]8 multilayered magnetic recording layer.

Subsequently, a 6-nm-thick C protective layer was stacked on the multilayered magnetic recording layer.

When the upper surface SEM image of the magnetic recording layer was observed in the same manner as in Example 1, the hole pattern having a plurality of holes was formed in the obtained magnetic recording layer. However, there could be confirmed a condition where the formed hole pattern was unclear, and no hole pattern was formed in some places, which provided the magnetic recording layer having no periodic structure. When sectional TEM observation was performed, the first hole pattern formed in the nonmagnetic underlayer had a size of about 3 nm; a silicon oxide recess pattern was partly embedded in the nonmagnetic underlayer; and the disappearance of the pattern was confirmed.

The recording/reproduction characteristics of the produced perpendicular magnetic recording medium were estimated in the same manner as in Example 1. The same reproduced waveform as that of FIG. 8 could be obtained in a recording density of 200 kFCI. However, when a record frequency was changed, it was found that the reproduced waveform began to collapse at about 700 KFCI; and irregular magnetic domains were formed and no recording was possible at 1000 kFCI.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording medium comprising:
   a substrate;
   a silicon oxide underlayer formed on the substrate and having a plurality of recesses having a recess pattern;
   a nonmagnetic underlayer formed on the silicon oxide underlayer and having a plurality of first holes having a first hole pattern corresponding to the recess pattern; and
   a magnetic recording layer formed on the nonmagnetic underlayer and having a plurality of second holes which have a second hole pattern corresponding to the first hole pattern, each of the second holes connected with a respective one of the first holes of the first hole pattern,
   said magnetic recording layer further having a grain boundary which joins adjacent of the second holes, and magnetic particles which are surrounded by the second holes and the grain boundary,
   wherein at least a part of each of the first holes is located within each respective one of the recesses, and
   wherein the plurality of recesses of the silicon oxide underlayer have a depth equal to or less than a diameter of the recesses.

2. The magnetic recording medium according to claim 1, wherein the plurality of recesses of the silicon oxide underlayer have a diameter of 10 nm or more, and are regularly arranged in a pitch of 30 nm or less.

3. The magnetic recording medium according to claim 1, wherein the magnetic recording layer is a multilayered magnetic recording layer obtained by alternately stacking two or more magnetic layers and two or more nonmagnetic layers.

4. The magnetic recording medium according to claim 1, wherein the magnetic recording layer mainly contains cobalt.

5. The magnetic recording medium according to claim 1, wherein the nonmagnetic layer mainly contains one of palladium and platinum.

6. A magnetic recording/reproduction apparatus comprising:
   a magnetic recording medium; and
   a magnetic head,
   wherein the magnetic recording medium comprising:
   a substrate;
   a silicon oxide underlayer formed on the substrate and having a plurality of recesses having a recess pattern;
   a nonmagnetic underlayer formed on the silicon oxide underlayer and having a plurality of first holes having a first hole pattern corresponding to the recess pattern; and
   a magnetic recording layer formed on the nonmagnetic underlayer and having a plurality of second holes which have a second hole pattern corresponding to the first hole pattern, each of the second holes connected with a respective one of the first holes, said magnetic recording layer further having a grain boundary which joins the adjacent second holes, and magnetic particles which are surrounded by the second holes and the grain boundary, wherein at least a part of each of the first holes is located within each respective one of the recesses, and wherein the plurality of recesses of the silicon oxide underlayer have a depth equal to or less than a diameter of the recesses.

7. The magnetic recording/reproduction apparatus according to claim 6, wherein the plurality of recesses of the silicon oxide underlayer have a diameter of 10 nm or more, and are regularly arranged in a pitch of 30 nm or less.

8. The magnetic recording/reproduction apparatus according to claim 6, wherein the magnetic recording layer is a multilayered magnetic recording layer obtained by alternately stacking two or more magnetic layers and two or more nonmagnetic layers.

9. The magnetic recording/reproduction apparatus according to claim 6, wherein the magnetic recording layer mainly contains cobalt.

10. The magnetic recording/reproduction apparatus according to claim 6, wherein the nonmagnetic layer mainly contains one of palladium and platinum.

11. The magnetic recording medium according to claim 1, wherein at least a part of the adjacent magnetic particles are in contact with each other at the grain boundary.

12. The magnetic recording/reproduction apparatus according to claim 6, wherein at least a part of the adjacent magnetic particles are in contact with each other at the grain boundary.

* * * * *